United States Patent
Liu et al.

(10) Patent No.: US 11,184,790 B2
(45) Date of Patent: Nov. 23, 2021

(54) COMMUNICATIONS METHOD AND APPARATUS

(71) Applicant: Huawei Technologies Co., Ltd., Shenzhen (CN)

(72) Inventors: Jin Liu, Shenzhen (CN); Pu Yuan, Shenzhen (CN); Keyvan Zarifi, Ottawa (CA); Jun Luo, Kista (SE); Kelvin Kar Kin Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 16/833,198

(22) Filed: Mar. 27, 2020

(65) Prior Publication Data

US 2020/0229017 A1 Jul. 16, 2020

Related U.S. Application Data

(63) Continuation of application No. PCT/CN2018/105871, filed on Sep. 15, 2018.

(30) Foreign Application Priority Data

Sep. 30, 2017 (CN) .......................... 201710945974.0

(51) Int. Cl.
*H04W 24/10* (2009.01)
*H04W 76/27* (2018.01)
(Continued)

(52) U.S. Cl.
CPC ............ *H04W 24/10* (2013.01); *H04L 5/0048* (2013.01); *H04W 24/02* (2013.01); *H04W 48/14* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2014/0301353 A1 | 10/2014 | Frenne et al. | |
| 2016/0080961 A1* | 3/2016 | Kim | ...................... H04L 5/0085 370/252 |
| 2017/0201898 A1* | 7/2017 | Park | ...................... H04L 5/0048 |

FOREIGN PATENT DOCUMENTS

| | | | |
|---|---|---|---|
| CN | 102769868 A | 11/2012 | |
| CN | 103096346 A | 5/2013 | |

(Continued)

OTHER PUBLICATIONS

"3rd Generation Partnership Project; Technical Specification Group Radio Access Network; NR; Physical Layer Procedures for Control (Release 15)," 3GPP TS 38.213 V1.0.0, Sep. 2017, 16 pages.

(Continued)

*Primary Examiner* — Kyaw Z Soe
(74) *Attorney, Agent, or Firm* — Slater Matsil, LLP

(57) ABSTRACT

This application discloses a communications method and apparatus, the method including sending a synchronization/broadcast signal block of a serving cell or a camping cell, sending at least one piece of cell measurement configuration information to a terminal device, where the at least one piece of cell measurement configuration information comprises N pieces of information indicating actual sending of a synchronization/broadcast signal block, and the N pieces of information indicating actual sending of a synchronization/broadcast signal block are used to indicate information about actually sent synchronization/broadcast signal blocks of M cells, where $1 \leq N \leq M$, where M is a quantity of measurement cells of the terminal device, and where both N and M are positive integers, and sending synchronization/broadcast signal blocks of the M measurement cells.

21 Claims, 11 Drawing Sheets

(51) Int. Cl.
*H04L 5/00* (2006.01)
*H04W 24/02* (2009.01)
*H04W 48/14* (2009.01)
*H04W 48/16* (2009.01)
*H04W 56/00* (2009.01)
*H04W 72/04* (2009.01)

(52) U.S. Cl.
CPC ......... *H04W 48/16* (2013.01); *H04W 56/001* (2013.01); *H04W 72/042* (2013.01); *H04W 76/27* (2018.02)

(56) References Cited

FOREIGN PATENT DOCUMENTS

| CN | 105657730 A | 6/2016 |
|---|---|---|
| CN | 106550395 A | 3/2017 |
| CN | 106792932 A | 5/2017 |
| CN | 106797611 A | 5/2017 |
| CN | 108024269 A | 5/2018 |

OTHER PUBLICATIONS

"3rd Generation Partnership Project; Technical Specification Group Radio Access Network; R; Radio Resource Control (RRC); Protocol specification (Release 15)," 3GPP TS 38.331 V0.1.0, Oct. 2017, 42 pages.

"Remaining Issues on SS Block Design and Indication Method," Agenda Item: 6.1.1.1.1, Source: LG Electronics, Document for: Discussion and Decision, 3GPP TSG RAN WG1 Meeting #90, R1-1713121, Aug. 21-25, 2017, 8 pages.

"Remaining Details on SS Block and SS Burst Set Design," Agenda Item: 6.1.1.1.1, Source: Huawei, HiSilicon, Document for: Discussion and Decision, 3GPP TSG RAN WG1 Meeting #90, R1-1712150, Aug. 21-25, 2017, 3 pages.

"Remaining Details on NR SS Blocks," Agenda Item: 6.1.1, Source: Huawei, HiSilicon, Document for: Discussion and Decision, 3GPP TSG RAN WG1 Meeting NR#3, R1-1715385, Sep. 18-21, 2017, 3 pages.

"Remaining Details on SS Block Transmissions," Source: Guandong OPPO Mobile Telecom, Agenda Item: 6.1.1, Document for: Discussion and Decision, 3GPP TSG RAN WG1 Meeting NR#3, R1-1715676, Sep. 18-21, 2017, 6 pages.

"Remaining Details on SS/PBCH Block Transmission," Agenda Item: 6.1.1, Source: LG Electronics, Document for: Discussion and Decision, 3GPP TSG RAN WG1 Meeting #90, R1-1715840, Sep. 18-21, 2017, 8 pages.

"Discussion on Remaining Details on NR-SS," Source: NTT Docomo, Inc., Agenda Item: 6.1.1, Document for: Discussion and Decision, 3GPP TSG RAN WG1 Meeting AH_NR#3, R1-1716069, Sep. 18-21, 2017, 7 pages.

"On Remaining System Information Delivery," Source: Nokia, Nokia Shanghai Bell, Document for: Discussion and Decision, 3GPP TSG-RAN WG1 NR AH#3, R1-1716525, Sep. 18-21, 2017, 7 pages.

\* cited by examiner

Synchronization burst set period 20 ms (default)

Synchronization signal block SS block

COMMUNICATIONS METHOD AND APPARATUS

CROSS-REFERENCE TO RELATED APPLICATIONS

This application is a continuation of International Application No. PCT/CN2018/105871, filed on Sep. 15, 2018, which claims priority to Chinese Patent Application No. 201710945974.0, filed on Sep. 30, 2017. The disclosures of the aforementioned applications are hereby incorporated by reference in their entireties.

TECHNICAL FIELD

This application relates to the field of communications technologies, and in particular, to a communications method and apparatus.

BACKGROUND

A new radio (NR) communications system supports repeated sending of a plurality of synchronization/broadcast signal blocks (synchronization signal (SS)/PBCH block, SSB), and a beamforming gain may be obtained through beam sweeping, to expand a coverage area. To maximize radio spectrum utilization, radio resource management (RRM) needs to be performed. Specifically, a synchronization signal block of a neighboring cell is received to obtain information such as load and a connection status of the neighboring cell.

In NR, it is specified that a maximum of four SSBs are supported by a frequency band below 3 GHz, a maximum of eight SSBs are supported by a 3 GHz to 6 GHz frequency band, and a maximum of 64 SSBs are supported by a frequency band above 6 GHz. However, a quantity of actually sent SSBs on each frequency band may be less than the maximum value. However, currently, a terminal device detects all possibly sent SSBs based on an entire SSB-based measurement timing configuration (SS block based RRM measurement timing configuration, SMTC) window. For example, SSBs at a maximum of 64 locations need to be detected for each cell.

Because a Long Term Evolution (LTE) communications system is not a multi-beam system, problems that a plurality of SSBs are repeatedly sent, and a quantity of actually sent SSBs is different from a theoretical maximum quantity of SSBs do not exist. Therefore, a solution for improving SSB detection efficiency is not provided in the prior art.

SUMMARY

This application provides a communications method and apparatus, to improve synchronization/broadcast signal block detection efficiency.

An aspect of this application provides a communication method, including: sending a synchronization/broadcast signal block of a serving cell or a camping cell; sending at least one piece of cell measurement configuration information to a terminal device, where the at least one piece of cell measurement configuration information includes N pieces of information indicating actual sending of a synchronization/broadcast signal block, and the N pieces of information indicating actual sending of a synchronization/broadcast signal block are used to indicate information about actually sent synchronization/broadcast signal blocks of M cells, where $1 \leq N \leq M$, M is a quantity of measurement cells of the terminal device, and both N and M are positive integers; and sending synchronization/broadcast signal blocks of the M measurement cells.

In this design, a network device sends the information indicating actual sending of an SSB to the terminal device, and the terminal device does not need to detect all possibly sent SSBs, to improve SSB detection efficiency. In addition, a quantity of pieces of information indicating actual sending of an SSB may be less than or equal to the quantity of measurement cells, to reduce overheads of sending the cell measurement configuration information.

In a possible design, the sending at least one piece of cell measurement configuration information to a terminal device includes: sending the at least one piece of cell measurement configuration information to the terminal device by using at least one of the following signaling, where the at least one of the following signaling includes remaining minimum system information (RMSI), other system information (OSI), terminal device dedicated radio resource control (RRC) signaling, and downlink control information (DCI).

In this design, when the terminal device is in an idle state, the network device may send the cell measurement configuration information by using the RMSI or the OSI. When the terminal device is in a connected state, the network device may send the cell measurement configuration information by using the RRC or the DCI.

Correspondingly, still another aspect of this application further provides a communications apparatus, and the communications apparatus may implement the foregoing communication method. For example, the communications apparatus may be a chip (such as a baseband chip or a communications chip) or a device (such as a network device or a baseband board). The communications apparatus may implement the foregoing method by using software or hardware or by using hardware executing corresponding software.

In a possible implementation, a structure of the communications apparatus includes a processor and a memory. The processor is configured to support the apparatus in executing a corresponding function in the foregoing communication method. The memory is coupled to the processor, and the memory stores a program (instruction) and data required by the apparatus. Optionally, the communications apparatus may further include a communications interface configured to support communication between the apparatus and another network element.

In another possible implementation, the communications apparatus may include a sending unit. The sending unit is configured to implement a sending function in the foregoing method. For example, the sending unit is configured to send a synchronization/broadcast signal block of a serving cell or a camping cell. The sending unit is further configured to send at least one piece of cell measurement configuration information to a terminal device, where the at least one piece of cell measurement configuration information includes N pieces of information indicating actual sending of a synchronization/broadcast signal block, and the N pieces of information indicating actual sending of a synchronization/broadcast signal block are used to indicate information about actually sent synchronization/broadcast signal blocks of M cells, where $1 \leq N \leq M$, M is a quantity of measurement cells of the terminal device, and both N and M are positive integers. The sending unit is further configured to send synchronization/broadcast signal blocks of the M measurement cells.

When the communications apparatus is a chip, the receiving unit may be an input unit, for example, an input circuit or a communications interface, and the sending unit may be an output unit, for example, an output circuit or a communications interface. When the communications apparatus is a device, the receiving unit may be a receiver (or may be referred to as a receiver), and the sending unit may be a transmitter (or may be referred to as a transmitter).

Optionally, the sending unit is specifically configured to send the at least one piece of cell measurement configuration information to the terminal device by using at least one of the following signaling, where the at least one of the following signaling includes remaining minimum system information RMSI, other system information OSI, terminal device dedicated radio resource control RRC signaling, and downlink control information DCI.

A still another aspect of this application provides a communication method, including: receiving a synchronization/broadcast signal block of a serving cell or a camping cell sent by a network device; receiving at least one piece of cell measurement configuration information sent by the network device, where the at least one piece of cell measurement configuration information includes N pieces of information indicating actual sending of a synchronization/broadcast signal block, and the N pieces of information indicating actual sending of a synchronization/broadcast signal block are used to indicate information about actually sent synchronization/broadcast signal blocks of M cells, where $1 \leq N \leq M$, M is a quantity of measurement cells of the terminal device, and both N and M are positive integers; and receiving synchronization/broadcast signal blocks of the M measurement cells based on the at least one piece of cell measurement configuration information.

In this design, the network device sends the information indicating actual sending of an SSB to the terminal device, and the terminal device does not need to detect all possibly sent SSBs, to improve SSB detection efficiency. In addition, a quantity of pieces of information indicating actual sending of an SSB may be less than or equal to the quantity of measurement cells, to reduce overheads of sending the cell measurement configuration information.

In a possible design, the receiving at least one piece of cell measurement configuration information sent by the network device includes: receiving the at least one piece of cell measurement configuration information by using at least one of the following signaling, where the at least one of the following signaling includes remaining minimum system information RMSI, other system information OSI, terminal device dedicated radio resource control RRC signaling, and downlink control information DCI.

In this design, when the terminal device is in an idle state, the cell measurement configuration information may be received by using the RMSI or the OSI. When the terminal device is in a connected state, the cell measurement configuration information may be received by using the RRC or the DCI.

Correspondingly, another aspect of this application further provides a communications apparatus, and the communications apparatus may implement the foregoing communication method. For example, the communications apparatus may be a chip (such as a baseband chip or a communications chip) or a device (such as a terminal device). The communications apparatus may implement the foregoing method by using software or hardware or by using hardware executing corresponding software. In a possible implementation, a structure of the communications apparatus includes a processor and a memory. The processor is configured to support the apparatus in executing a corresponding function in the foregoing communication method.

The memory is coupled to the processor, and the memory stores a program (instruction) and/or data required by the apparatus. Optionally, the communications apparatus may further include a communications interface configured to support communication between the apparatus and another network element.

In another possible implementation, the communications apparatus may include a receiving unit. The receiving unit is configured to implement a receiving function in the foregoing method. For example, the receiving unit is configured to receive a synchronization/broadcast signal block of a serving cell or a camping cell sent by a network device. The receiving unit is further configured to receive cell measurement configuration information sent by the network device, where the cell measurement configuration information includes N pieces of information indicating actual sending of a synchronization/broadcast signal block, and the N pieces of information indicating actual sending of a synchronization/broadcast signal block are used to indicate information about actually sent synchronization/broadcast signal blocks of M cells, where $1 \leq N \leq M$, M is a quantity of measurement cells of the terminal device, and both N and M are positive integers. The receiving unit is further configured to receive synchronization/broadcast signal blocks of the M measurement cells based on the cell measurement configuration information.

When the communications apparatus is a chip, the receiving unit may be an input unit, for example, an input circuit or a communications interface, and the sending unit may be an output unit, for example, an output circuit or a communications interface. When the communications apparatus is a device, the receiving unit may be a receiver (or may be referred to as a receiver), and the sending unit may be a transmitter (or may be referred to as a transmitter).

Optionally, the receiving unit is specifically configured to receive the cell measurement configuration information from the network device by using at least one of the following signaling, where the at least one of the following signaling includes remaining minimum system information (RMSI), other system information (OSI), terminal device dedicated radio resource control (RRC) signaling, and downlink control information (DCI).

With reference to the foregoing aspects, in a possible design, when N=1, the N pieces of information indicating actual sending of a synchronization/broadcast signal block are used to indicate some same information about actually sent synchronization/broadcast signal blocks of the M cells.

In this design, all cells use one piece of information indicating actual sending of an SSB for indication, and therefore signaling overheads are low.

With reference to the foregoing aspects, in another possible design, when N=M, the N pieces of information indicating actual sending of a synchronization/broadcast signal block include information about an actually sent synchronization/broadcast signal block of each of the M cells.

In this design, each cell uses one piece of information indicating actual sending of an SSB for indication, and therefore measurement accuracy is high.

With reference to the foregoing aspects, in still another possible design A, the N pieces of information indicating actual sending of a synchronization/broadcast signal block include information about an actually sent synchronization/broadcast signal block of each of N cell groups, and the M cells include the N cell groups.

In this design, cells are grouped based on patterns of actually sent SSBs and the like. Each cell group corresponds to one piece of information indicating actual sending of an SSB, and therefore measurement accuracy is relatively high, and configuration signaling overheads can be reduced.

With reference to the foregoing aspects, in still another possible design A', each of the N pieces of information indicating actual sending of a synchronization/broadcast signal block indicates information about an actually sent synchronization/broadcast signal block of at least one cell.

It should be understood that, in some cases, the design A and the design A' may be understood as different representations including a same design, and content in the design A and the design A' may be consistent. According to a grouping idea, the M cells may be grouped, or according to a non-grouping idea, one piece of information indicating actual sending of a synchronization/broadcast signal block may be used to indicate information about an actually sent synchronization/broadcast signal block of one or more cells.

For example, if one piece of information indicating actual sending of a synchronization/broadcast signal block may indicate information about actually sent synchronization/broadcast signal blocks of two cells, it may be considered that the two cells belong to one group, and therefore one piece of indication information is used for indication, or it may be understood that the two cells are indicated by using one piece of indication information for a reason other than grouping. Similarly, when three cells are indicated, it may be considered that the three cells belong to one group or do not belong to one group. Other cases may be deduced from the above description, and details are not described herein.

With reference to the foregoing aspects, in still another possible design, the M cells and the serving cell/camping cell are located on a same frequency band or different frequency bands.

With reference to the foregoing aspects, in still another possible design B, the N pieces of information indicating actual sending of a synchronization/broadcast signal block include information about an actually sent synchronization/broadcast signal block of each of N frequency band groups, the M cells are located on K frequency bands, and the K frequency bands include the N frequency band groups, where N≤K, and K is a positive integer.

In this design, frequency bands are grouped based on similarity of patterns of actually sent SSBs of cells on the frequency bands and the like. Each frequency band group corresponds to one piece of information indicating actual sending of an SSB, and therefore measurement accuracy is relatively high, and configuration signaling overheads can be reduced.

With reference to the foregoing aspects, in still another possible design B', each of the N pieces of information indicating actual sending of a synchronization/broadcast signal block indicates information about an actually sent synchronization/broadcast signal block of a cell on at least one frequency band. Optionally, the M cells are located on K frequency bands, where N≤K, and K is a positive integer.

It should be understood that, in some cases, the design B and the design B' may be understood as different representations including a same design, and content in the design B and the design B' may be consistent. According to a grouping idea, the M cells may be grouped based on the K frequency bands, or according to a non-grouping idea, one piece of information indicating actual sending of a synchronization/broadcast signal block may be used to indicate information about an actually sent synchronization/broadcast signal block of a cell on one or more frequency bands.

For example, if one piece of information indicating actual sending of a synchronization/broadcast signal block may indicate information about actually sent synchronization/broadcast signal blocks of cells on two frequency bands, it may be considered that the two frequency bands belong to one group, and therefore one piece of indication information is used for indication, or it may be understood that the cells on the two frequency bands are indicated by using one piece of indication information for a reason other than grouping. Similarly, when cells on three frequency bands are indicated, it may be considered that the three frequency bands belong to one group or do not belong to one group. Other cases may be deduced from the above description, and details are not described herein. With reference to the foregoing aspects, in still another possible design C, the M cells are located on W frequency bands, and the W frequency bands are grouped into X frequency band groups, where X≤W; and each of the X frequency band groups includes at least one cell group, and a total quantity of cell groups included in the X frequency band groups is N, where N≤X, and X and W are positive integers.

In this design, frequency bands are grouped based on similarity of patterns of actually sent SSBs of cells on the frequency bands and the like, and cells in each frequency band group are grouped. Therefore, measurement accuracy is relatively high, and configuration signaling overheads can be reduced.

With reference to the foregoing aspects, in still another possible design C, each of the N pieces of information indicating actual sending of a synchronization/broadcast signal block indicates information about an actually sent synchronization/broadcast signal block of at least one cell on at least one frequency band. Optionally, the M cells are located on W frequency bands.

It should be understood that, in some cases, the design C and the design C may be understood as different representations including a same design, and content in the design C and the design C may be consistent. According to a grouping idea, the M cells may be grouped into X groups based on the W frequency bands, and then cells in each frequency band group are grouped, or according to a non-grouping idea, one piece of information indicating actual sending of a synchronization/broadcast signal block may be used to indicate information about an actually sent synchronization/broadcast signal block of one or more cells on one or more frequency bands.

For example, when two frequency bands include three cells, if one piece of information indicating actual sending of a synchronization/broadcast signal block may indicate information about an actually sent synchronization/broadcast signal block of one cell on the two frequency bands, and another piece of information indicating actual sending of a synchronization/broadcast signal block may indicate information about actually sent synchronization/broadcast signal blocks of two cells on the two frequency bands, it may be considered that the two frequency bands belong to one group, where one cell is in one group, and the other two cells are in one group. Therefore, one piece of indication information is used for indication. Alternatively, it may be understood that, for a reason other than grouping, one piece of indication information is used to indicate one cell on the two frequency bands, and another piece of indication information is used to indicate the other two cells on the two frequency bands. Similarly, when three cells on three frequency bands are indicated, it may be considered that the three frequency bands belong to one group or do not belong to one group, and the three cells belong to one group or do not belong to one group. Other cases may be deduced from the above description, and details are not described herein.

With reference to the foregoing aspects, in still another possible design, the N pieces of information indicating actual sending of a synchronization/broadcast signal block include Y1 pieces of information indicating actual sending of synchronization/broadcast signal blocks of L1 cells in a first measurement window of a synchronization/broadcast signal block based measurement timing configuration (SMTC) and Y2 pieces of information indicating actual sending of synchronization/broadcast signal blocks of L2 cells in a second measurement window of an SMTC, a period of the first measurement window is different from a period of the second measurement window, and the M cells are located on a same frequency band, where N=Y1+Y2, and M=L1+L2.

In this design, for the M cells that are located on a frequency band same as that of the serving cell/camping cell, two SMTC measurement windows are used to measure actually sent SSBs of cells in the windows. Correspondingly, the information indicating actual sending of an SSB also includes information indicating the actually sent SSBs of the cells in the two SMTC measurement windows.

With reference to the foregoing aspects, in still another possible design, the Y1 pieces of information indicating actual sending of synchronization/broadcast signal blocks include information about an actually sent synchronization/broadcast signal block of each of Y1 groups, and the L1 cells include N groups; and the Y2 pieces of information indicating actual sending of synchronization/broadcast signal blocks include information about an actually sent synchronization/broadcast signal block of each of Y2 groups, and the L2 cells include the Y2 groups, where Y1, Y2, L1, and L2 are positive integers.

In this design, the information indicating the actually sent SSBs of the cells in the windows that is indicated by the two SMTC measurement windows may be information about actually sent SSBs of a plurality of cell groups.

With reference to the foregoing aspects, in still another possible design, the information indicating actual sending of a synchronization/broadcast signal block includes at least one of the following information: a full bitmap, a compressed bitmap, and a lookup table.

With reference to the foregoing aspects, in still another possible design, the at least one piece of cell measurement configuration information further includes at least one of the following information: common measurement information used for an intra-frequency/inter-frequency/inter-radio access technology (inter-RAT) system, a cell identity, frequency band information, and a measurement window configuration of an SMTC.

Still another aspect of this application provides a computer readable storage medium, the computer readable storage medium stores an instruction, and when the instruction runs on a computer, the computer is enabled to perform the methods in the foregoing aspects.

Still another aspect of this application provides a computer program product including an instruction, and when the computer program product runs on a computer, the computer is enabled to perform the methods in the foregoing aspects.

BRIEF DESCRIPTION OF THE DRAWINGS

To describe the technical solutions in the embodiments of the present invention or in the background more clearly, the following describes the accompanying drawings required for describing the embodiments of the present invention or the background.

DETAILED DESCRIPTION OF ILLUSTRATIVE EMBODIMENTS

The following describes the embodiments of the present invention with reference to the accompanying drawings in the embodiments of the present invention.

Figure 1:
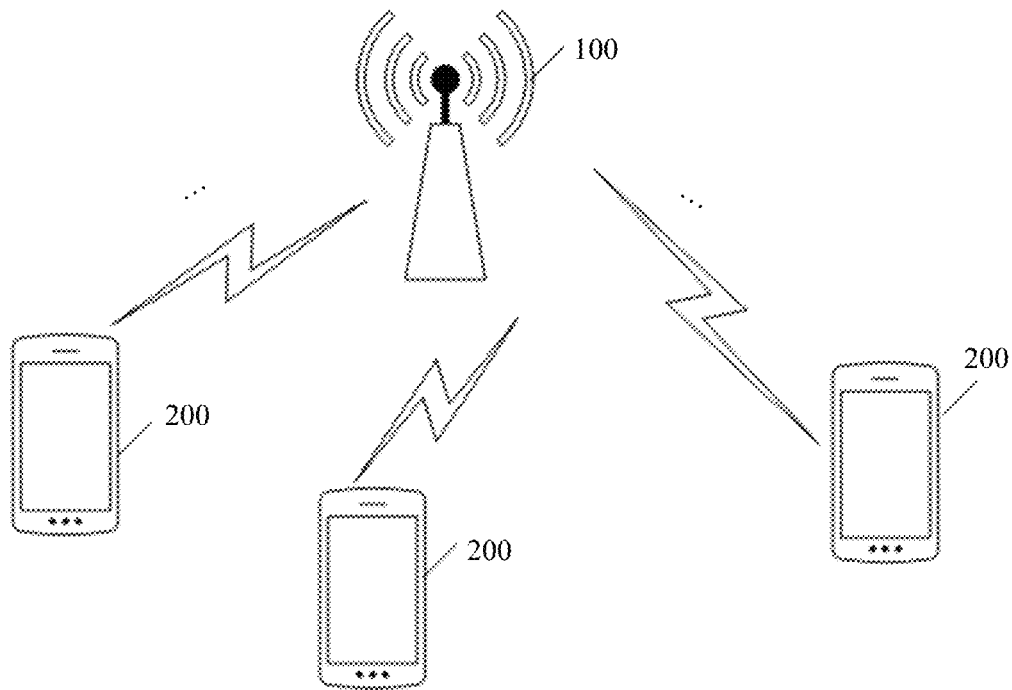
FIG. 1 is a schematic structural diagram of a communications system according to an embodiment of the present invention.

FIG. 1 is a schematic diagram of a communications system. The communications system may include at least one network device 100 (only one network device 100 is shown) and one or more terminal devices 200 connected to the network device 100.

The network device 100 may be a device that can communicate with the terminal device 200. The network device 100 may be any device that has a wireless transceiver function. The network device 100 includes but is not limited to a base station (for example, a NodeB, an evolved NodeB eNodeB, a base station in a fifth generation (the fifth generation, 5G) communications system, a base station or a network device in a future communications system, or an access node, a wireless relay node, or a wireless backhaul node in a Wi-Fi system) and the like. Alternatively, the network device 100 may be a radio controller in a cloud radio access network (cloud radio access network, CRAN) scenario. Alternatively, the network device 100 may be a network device in a 5G network or a network device in a future evolved network, or may be a wearable device, an in-vehicle device, or the like. Alternatively, the network device 100 may be a small cell, a transmission node (transmission reference point, TRP), or the like. Certainly, this application is not limited thereto.

The terminal device 200 is a device that has a wireless transceiver function. The terminal device 200 may be deployed on land and includes an indoor or outdoor device, a hand-held device, a wearable device, or an in-vehicle device, may be deployed on a water surface (for example, a ship), or may be deployed in the air (for example, an airplane, a balloon, or a satellite). The terminal device may be a mobile phone (mobile phone), a tablet computer (Pad), a computer that has a wireless transceiver function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. The terminal device may sometimes be referred to as user equipment (user equipment, UE), an access terminal device, a UE unit, a UE station, a mobile station, a mobile console, a remote station, a remote terminal device, a mobile device, a UE terminal device, a wireless communications device, a UE agent, a UE apparatus, or the like.

It should be noted that the terms "system" and "network" may be used interchangeably in the embodiments of the present invention. The term "a plurality of" means "at least two". In view of this, "a plurality of" can be understood as "at least two" in the embodiments of the present invention. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects.

Figure 2:
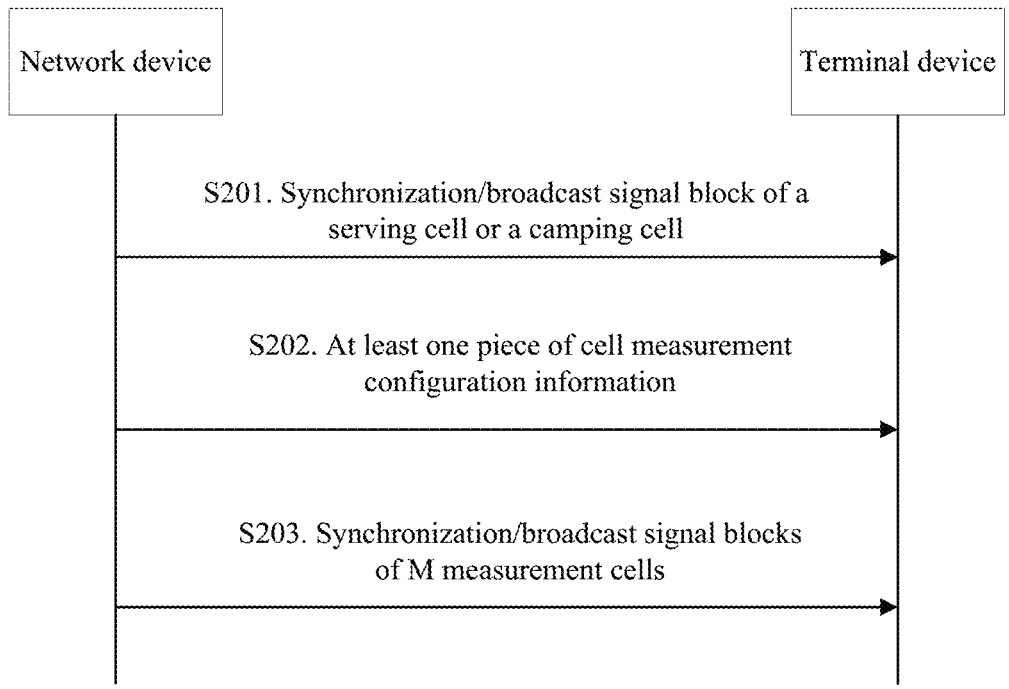
FIG. 2 is a schematic diagram of an interaction procedure in a communication method according to an embodiment of the present invention.

FIG. 2 is a schematic diagram of an interaction procedure in a communication method according to an embodiment of the present invention. The method may include the following steps.

S201. A network device sends a synchronization/broadcast signal block of a serving cell or a camping cell, and a terminal device receives the SSB.

S202. The network device sends at least one piece of cell measurement configuration information to the terminal device, and the terminal device receives the at least one piece of cell measurement configuration information.

The at least one piece of cell measurement configuration information includes N pieces of information indicating actual sending of a synchronization/broadcast signal block, and the N pieces of information indicating actual sending of a synchronization/broadcast signal block are used to indicate information about actually sent synchronization/broadcast signal blocks of M cells, where 1≤N≤M, M is a quantity of measurement cells of the terminal device, and both N and M are positive integers.

S203. The network device sends synchronization/broadcast signal blocks of the M measurement cells, and the terminal device receives the synchronization/broadcast signal blocks of the M measurement cells based on the at least one piece of cell measurement configuration information.

The network device sends an SSB of the serving cell or the camping cell of the terminal device to the terminal device, the terminal device receives the SSB, and the terminal device performs synchronization with the serving cell/camping cell. If the terminal device needs to perform cell selection or reselection, cell handover, or the like, the terminal device needs to obtain the sent SSB of the cell.

Because an actually sent SSB on each frequency band is uncertain, a quantity of actually sent SSBs on each frequency band may be less than or equal to a maximum quantity of SSBs supported by the frequency band. Therefore, the terminal device needs to obtain information indicating an actually sent SSB of a cell to accurately measure the sent SSB of the cell. The sent SSB of the measurement cell of the terminal device may be used for cell selection or reselection, cell handover, or the like. The measurement cell herein may be a serving cell/camping cell of the terminal device, or may be a neighboring cell of the serving cell/camping cell. For the measurement cell, in terms of cell size, the measurement cell may include a macro cell, a micro cell, and the like; in terms of a status of a connection to the terminal device, the measurement cell may include a serving cell (when the terminal device is in a connected (connected) state), a camping cell (when the terminal device is in an idle (idle) state), a neighboring cell, and a cell corresponding to the terminal device in an inactive (inactive) state.

Figure 3:
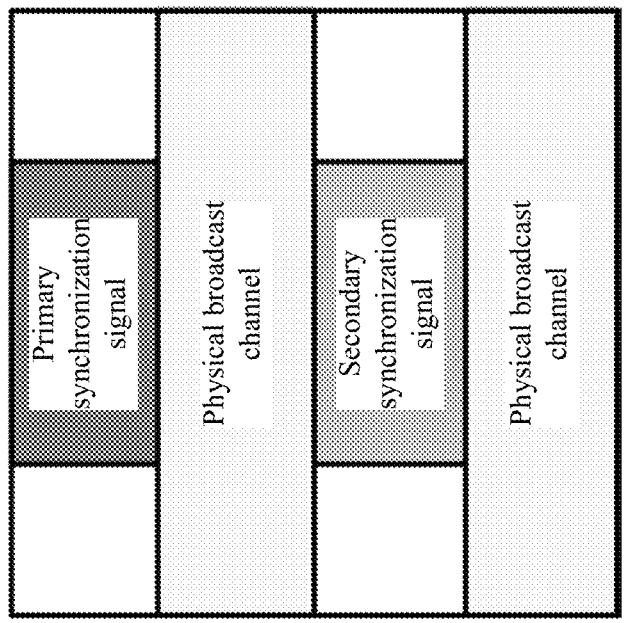
FIG. 3 is a schematic diagram of a signal structure of a synchronization/broadcast signal block.

FIG. 3 is a schematic diagram of a signal structure of a synchronization/broadcast signal block, and the synchronization/broadcast signal block includes a primary synchronization signal (primary synchronization signal, PSS), a secondary synchronization signal (secondary synchronization signal, SSS), and a physical broadcast channel (physical broadcast channel, PBCH). The PSS and the SSS are mainly used to help the terminal device identify a cell and synchronize with the cell. The PBCH includes most basic system information, for example, a system frame number and intra-frame timing information. That the terminal device successfully receives the synchronization/broadcast signal block is a prerequisite for accessing the cell by the terminal device. In the structure of the synchronization/broadcast signal block shown in FIG. 3, the PSS and the SSS each occupy one orthogonal frequency division multiplexing (orthogonal frequency division multiplexing, OFDM) symbol, the PBCH occupies two OFDM symbols, and a bandwidth occupied by the PBCH is approximately twice a bandwidth occupied by the PSS/SSS.

Figure 4:
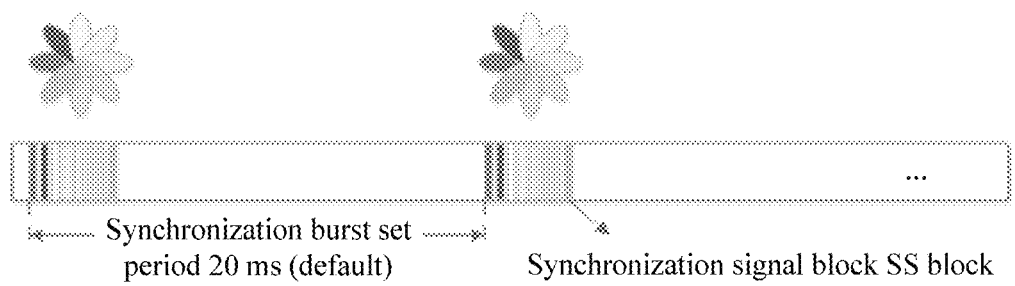
FIG. 4 is a schematic diagram of sending an SSB.

An SSB of a cell is repeatedly sent by using a plurality of beams. In a schematic diagram of sending an SSB shown in FIG. 4, in the cell, eight SSBs (referred to as a synchronization/broadcast signal block burst set (SS burst set)) are actually sent by using eight beams in one period, and the sending period is referred to as a synchronization/broadcast signal block burst set period (SS burst set period), for example, 20 ms by default.

In this embodiment, the network device sends one or more pieces of cell measurement configuration information to the terminal device, and the terminal device receives the one or more pieces of cell measurement configuration information. The network device sends an SSB of a measurement cell, and the terminal device receives the SSB of the measurement cell based on the one or more pieces of cell measurement configuration information. It should be noted that the network device may send the SSB of the serving cell/camping cell and the SSB of the measurement cell simultaneously or separately, that is, a sequence of S201 and S203 is not limited.

Specifically, the at least one piece of cell measurement configuration information includes N pieces of information indicating actual sending of a synchronization/broadcast signal block, and the N pieces of information indicating actual sending of a synchronization/broadcast signal block are used to indicate information about actually sent synchronization/broadcast signal blocks of M cells, where 1≤N≤M, M is a quantity of measurement cells of the terminal device, and both N and M are positive integers. To be specific, the network device may use one piece of information indicating actual sending of an SSB to indicate information about actually sent SSBs of all cells, or may use less than M pieces of information indicating actual sending of an SSB to indicate information about actually sent SSBs of M cells. Alternatively, each cell may use one piece of information indicating actual sending of an SSB to indicate information about an actually sent SSB of the cell. Detailed description is given below. It should be noted that the N pieces of information indicating actual sending of an SSB may be sent by using one piece of information or a plurality of pieces of information. In addition, the one or more pieces of cell measurement configuration information further include at least one of the following information: common measurement information (common information) used for an intra-frequency/inter-frequency/inter-RAT system, a cell identity (cell ID), frequency band information (frequency information), and a measurement window configuration of a synchronization signal block based measurement timing configuration (SS block based RRM measurement timing configuration, SMTC). The information indicating actual sending of an SSB includes at least one of the following information: a full bitmap, a compressed bitmap, and a lookup table.

Further, in S202, the network device may send the at least one piece of cell measurement configuration information to the terminal device by using at least one of the following signaling, and the at least one of the following signaling includes remaining minimum system information (RMSI), other system information (OSI), terminal device dedicated radio resource control (RRC) signaling, and downlink control information (DCI). The terminal device may also receive the at least one piece of cell measurement configuration information by using the at least one of the foregoing signaling. When the terminal device is in an idle state, the network device may receive cell sending configuration information by using the RMSI or the OSI. When the terminal device is in a connected state, the network device may send the cell measurement configuration information by using the RRC or the DCI. The following provides detailed description with reference to a case in which the terminal device is in different states.

Figure 5A:
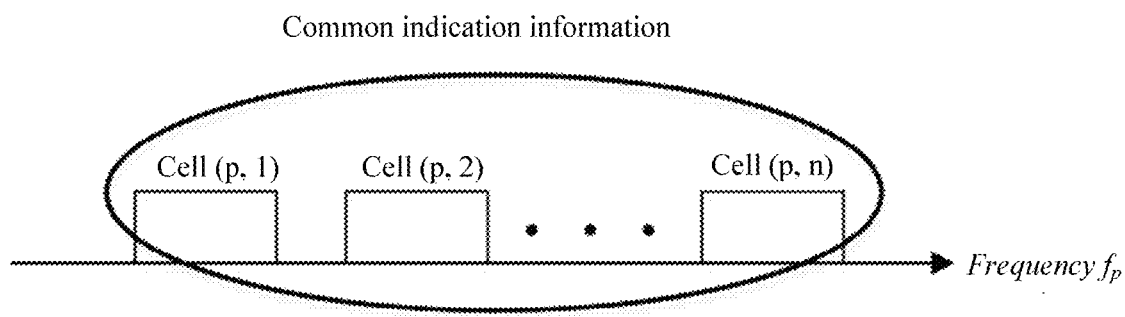
FIG. 5a to FIG. 5i are schematic diagrams of information indicating actual sending of an SSB.
Figure 5B:
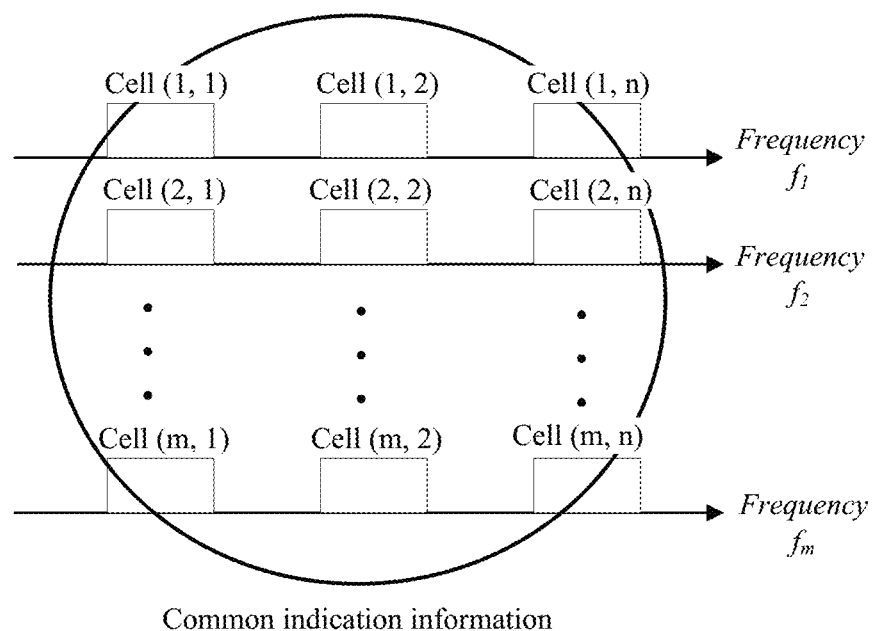

The following several manners may be available for the information indicating actual sending of an SSB. Certainly, the present invention is not limited to the following listed indication manners:

In a possible design, when N=1, the N pieces of information indicating actual sending of a synchronization/broadcast signal block are used to indicate some same information about actually sent synchronization/broadcast signal blocks of the M cells. Depending on whether the M cells and the serving cell/camping cell are located on a same frequency band, two cases are separately described as follows: As shown in FIG. 5a, if a frequency band $f_p$ on which a cell (p, 1) to a cell (p, n) are located is the same as a frequency band of the serving cell/camping cell, one piece of information indicating actual sending of an SSB (referred to as common indication information) is used herein to indicate some same information about actually sent SSBs of all cells on the frequency band, that is, N=1. As shown in FIG. 5b, if cells in the figure and the serving cell/camping cell are located on different frequency bands, for all cells that are located on different frequency bands from the serving cell/camping cell, one piece of information indicating actual sending of an SSB (referred to as common indication information) is used to indicate some same information about actually sent SSBs of all cells on all these frequency bands, that is, N=1. It should be noted that herein, some same information about an actually sent SSB of each cell may be indicated. For example, there are two measurement cells. It is assumed that the information indicating actual sending of an SSB indicates that information about actually sent SSBs of the two cells is locations 1, 3, 5, and 7 in a pattern. However, SSBs are actually sent at locations 1, 2, 3, 5, and 7 of a cell 1, and SSBs are actually sent at locations 5 and 7 of a cell 2. In this case, when measuring SSBs of the cell 1 and the cell 2, the terminal device can actually measure SSBs only at locations 1, 3, 5, and 7 of the cell 1, and for the cell 2, can measure SSBs only at the locations 5 and 7. In this design, all cells use one piece of information indicating actual sending of an SSB for indication, and therefore signaling overheads are low.

Figure 5C:
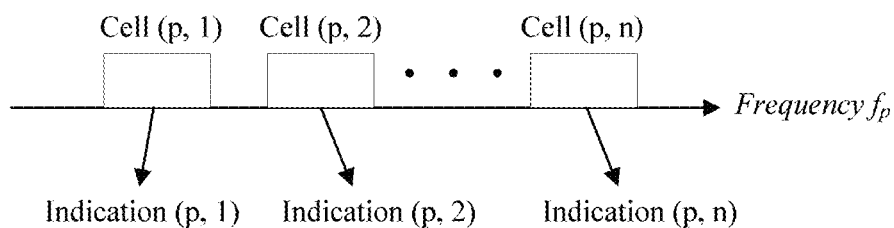
Figure 5D:
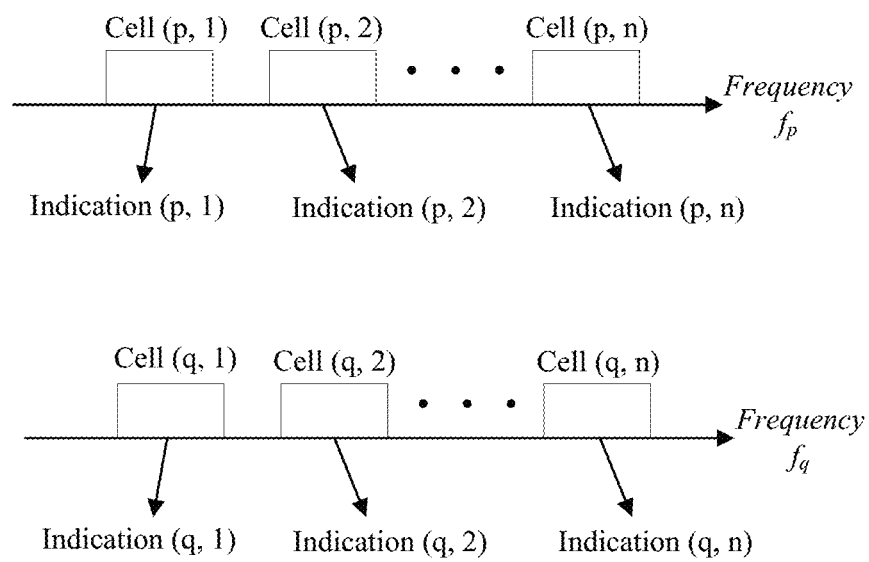

In another possible design, when N=M, the N pieces of information indicating actual sending of a synchronization/broadcast signal block include information about an actually sent synchronization/broadcast signal block of each of the M cells. Depending on whether the M cells and the serving cell/camping cell are located on a same frequency band, two cases are also separately described as follows: As shown in FIG. 5c, if a frequency band $f_p$ on which a cell (p, 1) to a cell (p, n) are located is the same as a frequency band of the serving cell/camping cell, n pieces of information indicating actual sending of an SSB are used herein to indicate information about actually sent SSBs of n cells on the frequency band. To be specific, information about an actually sent SSB of each cell is indicated by using one piece of information indicating actual sending of an SSB. As shown in FIG. 5d, if cells in the figure and the serving cell/camping cell are located on different frequency bands, one piece of information indicating actual sending of an SSB is used for indication for each of the cells located on different frequency bands from the serving cell/camping cell. In this design, each cell uses one piece of information indicating actual sending of an SSB for indication, and therefore measurement accuracy is high.

Figure 5E:
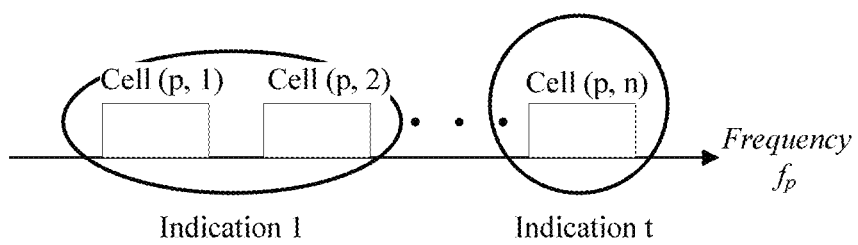
Figure 5F:
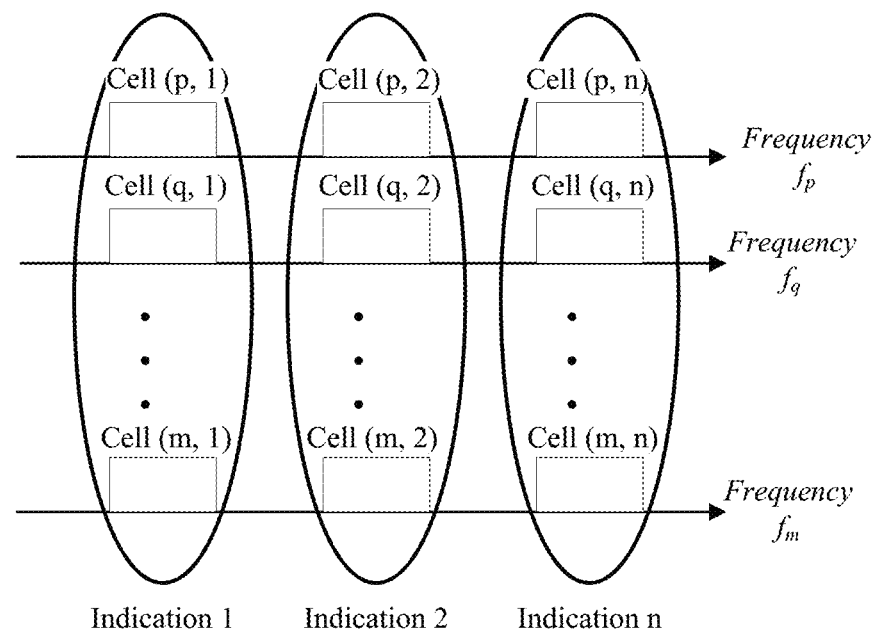
Figure 5G:
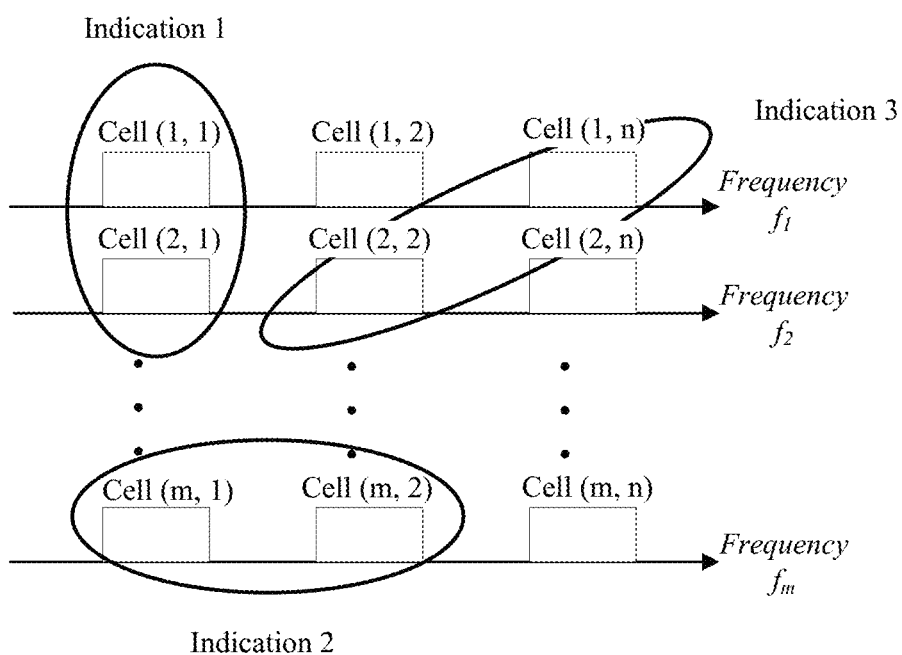

In still another possible design, the N pieces of information indicating actual sending of a synchronization/broadcast signal block include information about an actually sent synchronization/broadcast signal block of each of N cell groups, and the M cells include the N cell groups. In other words, the information indicating actual sending of a synchronization/broadcast signal block includes N pieces of information, and each piece of information indicates information indicating actual sending of a synchronization/broadcast signal block of at least one cell. Three cases are separately described as follows: As shown in FIG. 5e, if a frequency band $f_p$ on which a cell (p, 1) to a cell (p, n) are located is the same as a frequency band of the serving cell/camping cell, the cell (p, 1) to the cell (p, n) are grouped into t cell groups, and t pieces of information indicating actual sending of an SSB are used to indicate information about actually sent SSBs of the n cells. For example, an indication 1 is used to indicate information about actually sent SSBs of the cell (p, 1) and the cell (p, 2), and an indication t is used to indicate information about an actually sent SSB of the cell (p, n), where t≤n. As shown in FIG. 5f, a plurality of cells located on different frequency bands are grouped into one cell group, and an indication 1 to an indication n are separately used to indicate information about actually sent SSBs of the plurality of cell groups. As shown in FIG. 5g, a frequency band corresponding to cells for which grouping is performed may be the same as or different from a frequency band of the serving cell/camping cell. In this design, cells are grouped based on patterns of actually sent SSBs and the like. Each cell group corresponds to one piece of information indicating actual sending of an SSB, and therefore measurement accuracy is relatively high, and configuration signaling overheads can be reduced.

Figure 5H:
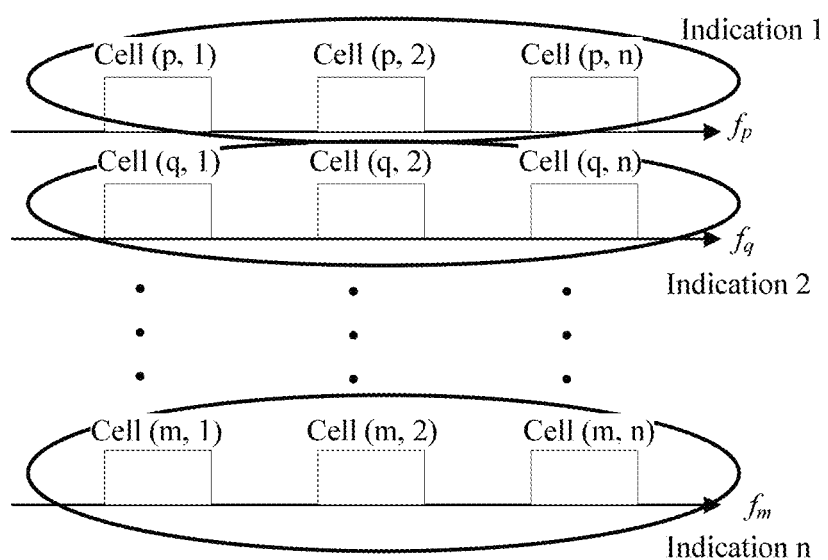

In still another possible design, the N pieces of information indicating actual sending of a synchronization/broadcast signal block include information about an actually sent synchronization/broadcast signal block of each of N frequency band groups, the M cells are located on K frequency bands, and the K frequency bands include the N frequency band groups, where N≤K, and K is a positive integer. In other words, the information indicating actual sending of a synchronization/broadcast signal block includes N pieces of information, each piece of information indicates information indicating actual sending of a synchronization/broadcast signal block of at least one cell, and the at least one cell belongs to one frequency band. As shown in FIG. 5h, cells on a plurality of different frequency bands from the frequency band of the serving cell/camping cell are grouped based on the frequency bands. To be specific, a cell (p, 1) to a cell (p, n) on a frequency band $f_p$ are indicated by using an indication 1; a cell (q, 1) to a cell (q, n) on a frequency band $f_q$ are indicated by using an indication 2; and so on. In this design, frequency bands are grouped based on similarity of patterns of actually sent SSBs of cells on the frequency bands and the like. Each frequency band group corresponds to one piece of information indicating actual sending of an SSB, and therefore measurement accuracy is relatively high, and configuration signaling overheads can be reduced.

Figure 5I:
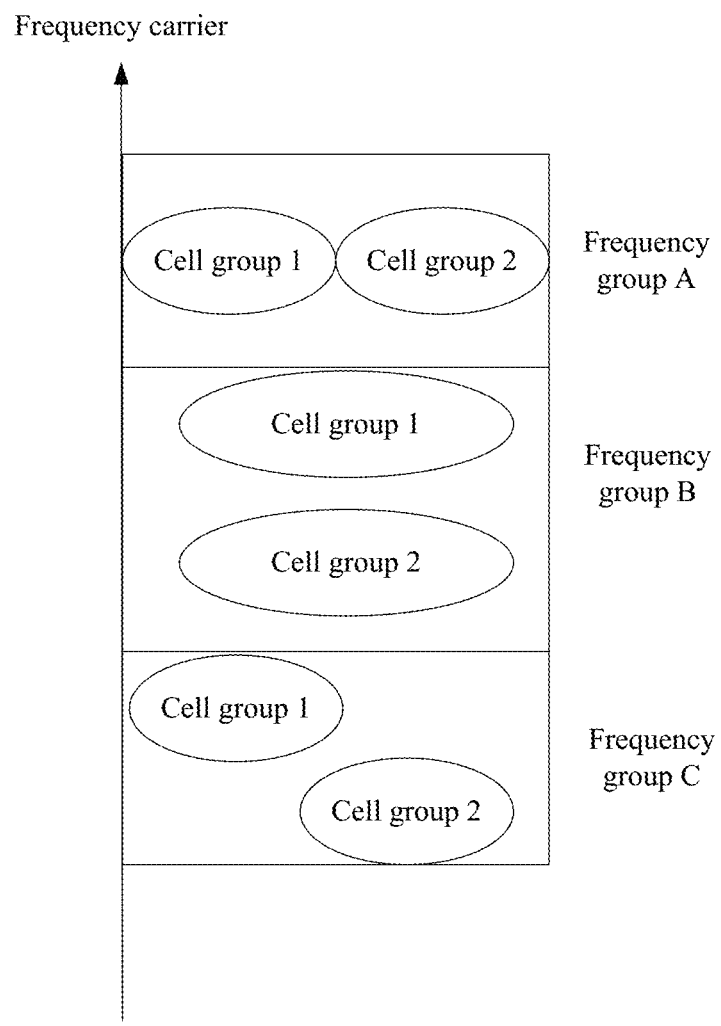

With reference to the foregoing aspects, in still another possible design, the M cells are located on W frequency bands, and the W frequency bands include X frequency band groups, where X≤W; and each of the X frequency band groups includes at least one cell group, and a total quantity of cell groups included in the X frequency band groups is N, where N≤X, and X and W are positive integers. In other words, the information indicating actual sending of a synchronization/broadcast signal block includes N pieces of information, each piece of information indicates information indicating actual sending of a synchronization/broadcast signal block of at least one cell, and the at least one cell belongs to one cell set of one frequency band. As shown in FIG. 5i, first, a plurality of frequency bands different from that of the serving cell/camping cell are grouped into a frequency band group A, a frequency band group B, and a frequency band group C, and each frequency band group includes one or more frequency bands. Then, cell grouping is performed on a plurality of cells corresponding to each frequency band group. For example, cells in the frequency band group A are grouped into a cell group 1 and a cell group 2, and cells in the frequency band group B and cells in the frequency band group C are also separately grouped into the cell group 1 and the cell group 2. For each cell group, one piece of information indicating actual sending of an SSB is used to indicate information about an actually sent SSB of the cell group. In this design, frequency bands are grouped based on similarity of patterns of actually sent SSBs of cells on the frequency bands and the like, and cells in each frequency band group are grouped. Therefore, measurement accuracy is relatively high, and configuration signaling overheads can be reduced.

With reference to the foregoing aspects, in still another possible design, the N pieces of information indicating actual sending of a synchronization/broadcast signal block include Y1 pieces of information indicating actual sending of synchronization/broadcast signal blocks of L1 cells in a first measurement window of a synchronization/broadcast signal block based measurement timing configuration SMTC and Y2 pieces of information indicating actual sending of synchronization/broadcast signal blocks of L2 cells in a second measurement window of an SMTC, a period of the first measurement window is different from a period of the second measurement window, and the M cells are located on a same frequency band, where N=Y1+Y2, and M=L1+L2.

Figure 6:
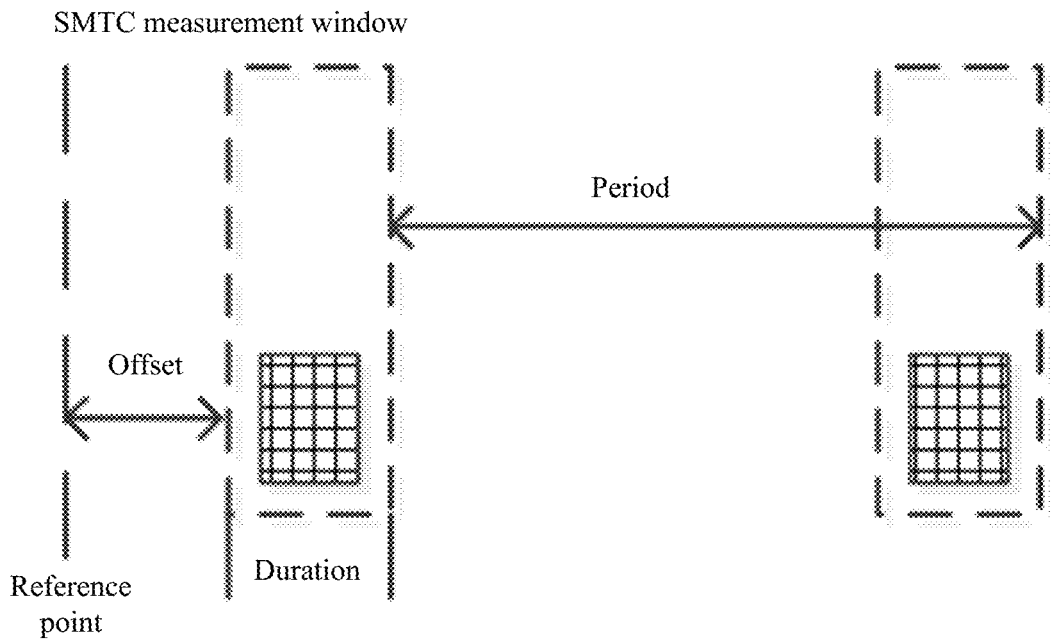
FIG. 6 is a schematic diagram of an SMTC measurement window.

First, an SMTC measurement window is described. In a schematic diagram of an SMTC measurement window shown in FIG. 6, an SMTC includes at least one of the following parameters: a measurement periodicity, measurement duration, and an offset.

Figure 7:
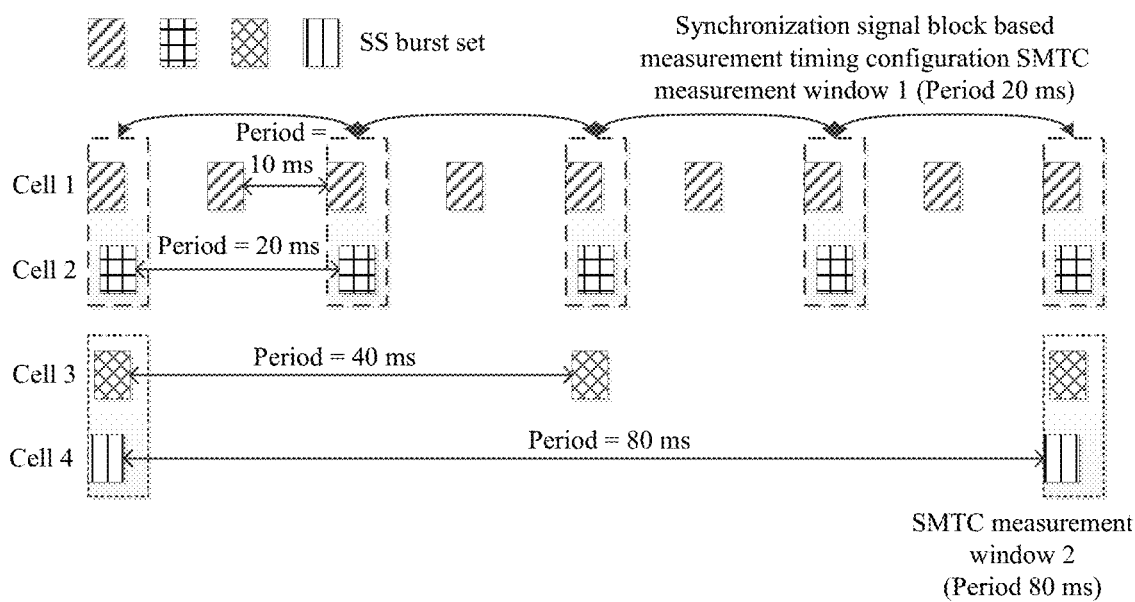
FIG. 7 is a schematic diagram of two SMTC measurement windows.

Then, for a frequency band same as that of the serving cell/camping cell, the information indicating actual sending of an SSB is divided into a maximum of two SMTC measurement windows for indication; for a frequency band different from that of the serving cell/camping cell, each frequency band corresponds to one SMTC measurement window. In a schematic diagram of two SMTC measurement windows shown in FIG. 7, a cell 1 to a cell 4 separately have different SS burst sets. A measurement period of the cell 1 is to ms, a measurement period of the cell 2 is 20 ms, a measurement period of the cell 3 is 40 ms, and a measurement period of the cell 4 is 80 ms. The measurement periods of the cell 1 and the cell 2 are greatly different from those of the cell 3 and the cell 4. If the four cells are measured by using one SMTC measurement window, the terminal device needs to wait for an 80 ms measurement period. In this embodiment, the measurement periods of the cell 1 and the cell 2 are relatively close, and the network device instructs the terminal device to perform measurement in an SMTC measurement window 1 (the measurement period is 20 ms). The two measurement periods of the cell 3 and the cell 4 are relatively close, and the network device instructs the terminal device to perform measurement in an SMTC measurement window 2 (the measurement period is 80 ms).

In still another possible design, the Y1 pieces of information indicating actual sending of synchronization/broadcast signal blocks include information about an actually sent synchronization/broadcast signal block of each of Y1 groups, and the L1 cells include N groups; and the Y2 pieces of information indicating actual sending of synchronization/broadcast signal blocks include information about an actually sent synchronization/broadcast signal block of each of Y2 groups, and the L2 cells include the Y2 groups, where Y1, Y2, L1, and L2 are positive integers.

Figure 8:
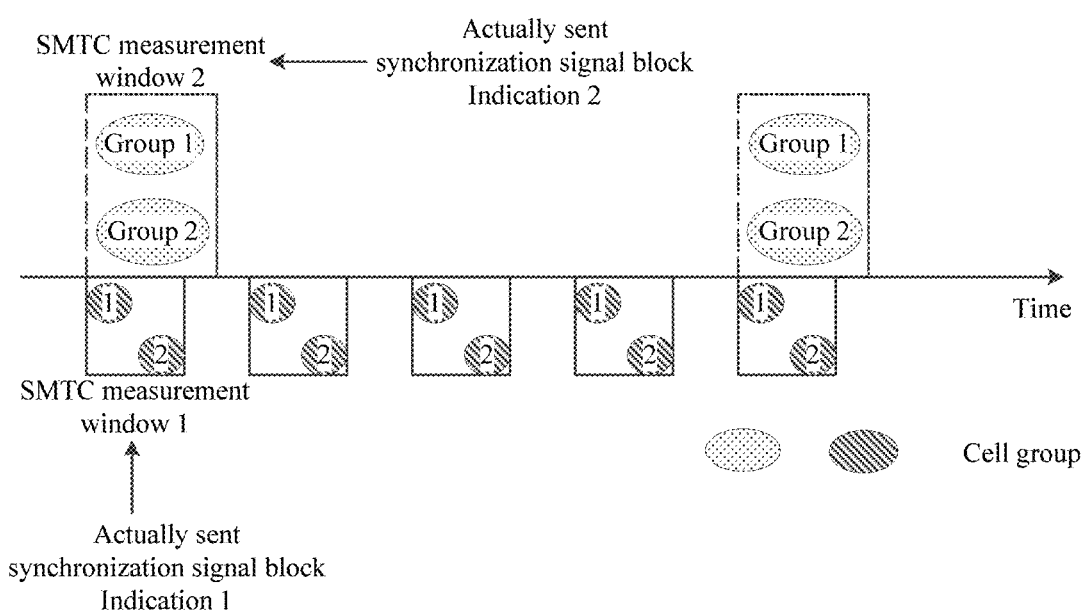
FIG. 8 is a schematic diagram of information indicating actual sending of an SSB in two SMTC measurement windows.

Specifically, as shown in FIG. 8, two SMTC measurement windows: an SMTC measurement window 1 and an SMTC measurement window 2 are included, and a measurement period of the SMTC measurement window 1 (shown in a solid-line box) is less than a measurement period of the SMTC measurement window 2 (shown in a dashed-line box). Cell grouping may be performed on the L1 cells whose SSBs are sent in the SMTC measurement window 1, and Y1 pieces of information indicating actual sending of an SSB are used to indicate information about actually sent SSBs of the L1 cells. Similarly, cell grouping may be performed on the L2 cells whose SSBs are sent in the SMTC measurement window 2, and Y2 pieces of information indicating actual sending of an SSB are used to indicate information about actually sent SSBs of the L2 cells.

In this design, for the M cells that are located on a same frequency band as the serving cell/camping cell, two SMTC measurement windows are used to measure actually sent SSBs of cells in the windows. Correspondingly, the information indicating actual sending of an SSB also includes information indicating the actually sent SSBs of the cells in the two SMTC measurement windows. The information indicating the actually sent SSBs of the cells in the windows that is indicated by the two SMTC measurement windows may be information about actually sent SSBs of a plurality of cell groups.

The terminal device obtains indication information of an actually sent synchronization signal block of a neighboring cell, and the terminal device may detect the actually transmitted synchronization signal block in an SMTC window, without detecting synchronization signal blocks at all possible locations in the SMTC window. For example, it is assumed that the terminal device obtains information about actually sent to synchronization signal blocks and corresponding time locations, and the terminal device performs to times of detection. However, if the terminal device does not know the information, the terminal device simply performs 64 times of detection at all possible locations. If there are N neighboring cells, and to synchronization signal blocks of each of the N neighboring cells are actually sent, a workload ratio of detection by the terminal device is 10×N/64×N. Power consumption of the terminal device is greatly reduced. Therefore, that the terminal device obtains indication information of an actually sent synchronization signal block is very important for radio resource management.

In the foregoing description of this embodiment, the grouping manner is used for description. Actually, grouping may not be performed, and a one-to-one or one-to-many manner is used.

According to the communication method provided in this embodiment of the present invention, the network device sends the information indicating actual sending of a synchronization/broadcast signal block to the terminal device, and the terminal device does not need to detect all possibly sent synchronization/broadcast signal blocks, to improve synchronization/broadcast signal block detection efficiency. In addition, the quantity of pieces of information indicating actual sending of a synchronization/broadcast signal block may be less than or equal to the quantity of measurement cells, to reduce overheads of sending the cell measurement configuration information.

When the terminal device is in different connection statuses, and the terminal device is in an intra-frequency, inter-frequency, or inter-RAT system, cell measurement configuration information and sent signaling vary. The following provides detailed description by using different implementations.

In an implementation, when the terminal device is in an idle state, the terminal device receives cell configuration information by using RMSI or OSI. Specifically, each piece of information in the cell configuration information is sent by using different system information (SI-a, SI-b, SI-c, and SI-d described below are merely used to distinguish between the different system information, but do not represent actual system information names):

(1) SI-a is used to send the common measurement information used for the intra-frequency/inter-frequency/inter-RAT system.

(2) SI-b is used to send cell measurement configuration information of an intra-frequency cell other than the common measurement information, including: a measurement cell identity, a measurement window configuration of a single SMTC, and the N pieces of information indicating actual sending of a synchronization/broadcast signal block.

The N pieces of information indicating actual sending of a synchronization/broadcast signal block may use the indication manners shown in FIG. 5a, FIG. 5c, and FIG. 5e. ϕ(3) SI-c is used to send cell measurement configuration information of an inter-frequency cell other than the common measurement information, including: frequency band information, a measurement cell identity, a measurement window configuration of a single SMTC of each frequency band, and the N pieces of information indicating actual sending of a synchronization/broadcast signal block.

The N pieces of information indicating actual sending of a synchronization/broadcast signal block may use the indication manners shown in FIG. 5b, FIG. 5d, and FIG. 5f to FIG. 5i.

(4) SI-d is used to send cell measurement configuration information of cells in a plurality of wireless communications systems (inter-RAT) other than the common measurement information.

The inter-RAT system includes wireless communications systems such as UTRAN FDD and TDD, and GERAN and CDMA 2000.

In another implementation, when the terminal device is in an inter-frequency connected state, the terminal device receives cell configuration information by using RRC or DCI. The cell configuration information includes five measurement elements and the N pieces of information indicating actual sending of a synchronization/broadcast signal block. The five measurement elements include a measurement object, a reporting configuration, a measurement identity (measurement ID), a measurement quantity configuration, and a measurement gap. The measurement gap is optional. The N pieces of information indicating actual sending of a synchronization/broadcast signal block may use the indication manners shown in FIG. 5b, FIG. 5d, and FIG. 5f to FIG. 5i.

The five measurement elements are specifically described as follows:

Measurement Object

For intra-frequency measurement and inter-frequency measurement, a measurement object is a single Evolved Universal Terrestrial Radio Access (E-UTRA) carrier frequency. Associated with the carrier frequency, an Evolved-Universal Mobile Telecommunications Service (UMTS) Terrestrial Radio Access Network (E-UTRAN) can configure a list of cell-specific frequency offsets and a list of blacklisted cells. Blacklisted cells are not considered in event evaluation or measurement reporting.

For inter-RAT Universal Terrestrial Radio Access (UTRA) measurement, a measurement object is a set of cells on a single UTRA carrier frequency.

For inter-RAT GERAN measurement, a measurement object is a set of GERAN carrier frequencies.

Reporting Configuration

When a measurement report condition is met, event reporting is triggered for the eUTRAN. Content includes a measurement ID, a measurement result of a serving cell (measurement values of RSRP and RSRQ), and a measurement result of a neighboring cell (optional).

Measurement reporting manner: In terms of trigger type, periodic trigger and event trigger are included.

Periodic trigger. Periodic sending is performed based on a reporting interval set by an eNB and a total quantity of reporting times.

ReportStrongestCells: A strongest cell is reported.

ReportCGI: A global cell identity is reported.

Event trigger: A measurement report is sent when a report condition is met.

Measurement ID (measurement identity)

Each measurement ID corresponds to one measurement object and one reporting configuration. A plurality of measurement IDs may correspond to a plurality of measurement objects and a same reporting configuration, or may correspond to one measurement object and a plurality of reporting configurations.

Quantity configuration (measurement quantity configuration)

The measurement quantity configuration defines a measurement quantity and reporting types used for all event evaluation and related measurement. One filter can be configured per measurement quantity.

Measurement gap (measurement gap)

The measurement gap defines a time for a user to perform inter-frequency measurement (for inter-frequency measurement), including two parameters: a measurement gap repetition period and a measurement gap length.

In still another implementation, when the terminal device is in an intra-frequency connected state, the terminal device receives cell configuration information by using RRC or DCI. The cell configuration information includes five measurement elements and the N pieces of information indicating actual sending of a synchronization/broadcast signal block. The N pieces of information indicating actual sending of a synchronization/broadcast signal block may use the indication manners shown in FIG. 5a, FIG. 5c, and FIG. 5e.

The method in the embodiments of the present invention is described in detail above, and an apparatus in the embodiments of the present invention is provided below.

Figure 9:
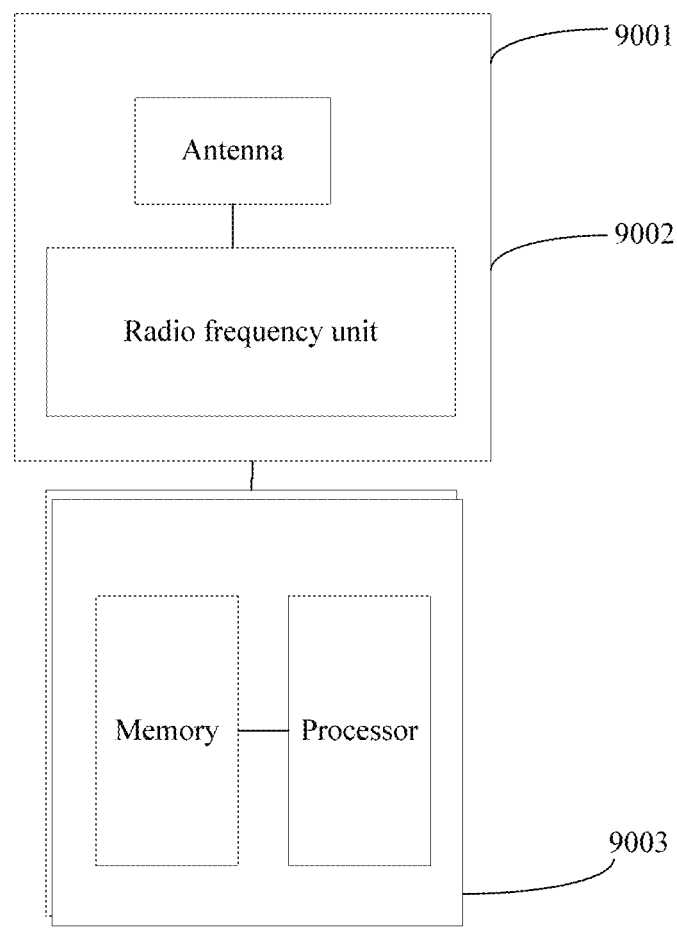
FIG. 9 is a simplified schematic structural diagram of a network device.

FIG. 9 is a simplified schematic structural diagram of a network device. The network device includes a radio frequency signal receive/transmit and conversion part and a part 9003. The radio frequency signal receive/transmit and conversion part further includes a receiving unit part 9001 and a sending unit part 9002 (or may be collectively referred to as a transceiver unit). The radio frequency signal receive/transmit and conversion part is mainly configured to receive/transmit a radio frequency signal and perform conversion between the radio frequency signal and a baseband signal. The part 9003 is mainly configured to perform baseband processing and control the network device or the like. The receiving unit 9001 may also be referred to as a receiver, a receiving circuit, or the like, and the sending unit 9002 may also be referred to as a transmitter, a transmitting circuit, or the like. The part 9003 is usually a control center of the network device, and may be usually referred to as a processing unit, and is configured to control the network device to perform steps performed by the network device in FIG. 2. For details, refer to the description of the foregoing related parts.

The part 9003 may include one or more boards. Each board may include one or more processors and one or more memories. The processor is configured to read and execute a program in the memory to implement a baseband processing function and control the network device. If a plurality of boards exist, the boards may be interconnected to improve a processing capability. In an optional implementation, the plurality of boards may share one or more processors, or the plurality of boards share one or more memories.

For example, in an embodiment, the sending unit 9002 is configured to perform steps S201 to S203 in FIG. 2.

In another optional implementation, with development of a system-on-chip (SoC) technology, all or some functions of the part 9001 to the part 9003 may be implemented by using the SoC technology. For example, the all or some functions are implemented by a base station function chip. Components such as a processor, a memory, and an antenna interface are integrated into the base station function chip. A program of a related function of the base station is stored in the memory, and the processor executes the program to implement the related function of the base station. Optionally, the base station function chip can read a memory outside the chip to implement the related function of the base station.

Figure 10:
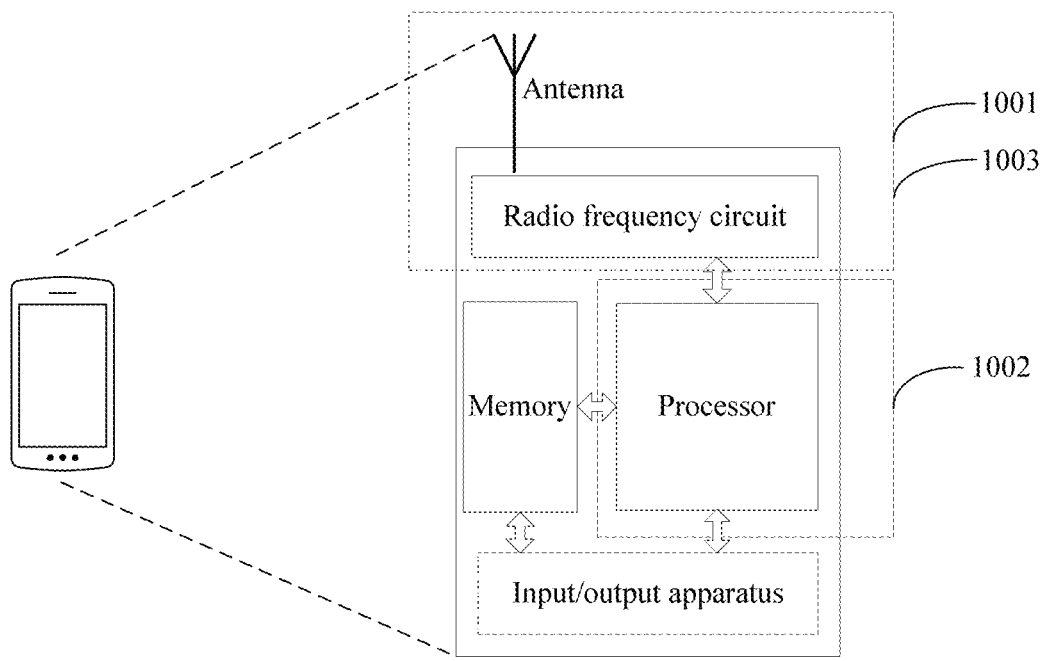
FIG. 10 is a simplified schematic structural diagram of a terminal device.

FIG. 10 is a simplified schematic structural diagram of a terminal device. For ease of understanding and illustration, in FIG. to, for example, the terminal device is a mobile phone. As shown in FIG. to, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus such as a touchscreen, a display screen, or a keyboard is mainly configured to: receive data entered by a user, and output data to the user. It should be noted that some types of terminal devices may not have an input/output apparatus.

When the processor needs to send data, the processor outputs a baseband signal to the radio frequency circuit after performing baseband processing on the to-be-sent data. After performing radio frequency processing on the baseband signal, the radio frequency circuit sends a radio frequency signal in an electromagnetic wave form by using the antenna. When data is to be sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, only one memory and one processor are shown in FIG. 10. In an actual terminal device product, there may be one or more processors and one or more memories. The memory may also be referred to as a storage medium, a storage device, or the like. The memory may be disposed independently of the processor, or may be integrated with the processor. This is not limited in this embodiment of this application.

In this embodiment of this application, the antenna and the radio frequency circuit that have a transceiver function may be considered as a receiving unit and a sending unit (or may be collectively referred to as a transceiver unit) of the terminal device, and the processor that has a processing function is considered as a processing unit of the terminal device. As shown in FIG. to, the terminal device includes a receiving unit 1001, a processing unit 1002, and a sending unit 1003. The receiving unit tool may also be referred to as a receiver, a receiving circuit, or the like, and the sending unit 1003 may also be referred to as a transmitter, a transmitting circuit, or the like. The processing unit may also be referred to as a processor, a processing board, a processing module, a processing apparatus, or the like.

For example, in an embodiment, the receiving unit tool is configured to perform steps S201 to S203 in the embodiment shown in FIG. 2.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer readable storage medium, or may be transmitted by using the computer readable storage medium. The computer instructions may be transmitted from a website, computer, server, or data center to another website, computer, server, or data center in a wired manner (for example, by using a coaxial cable, an optical fiber, or a digital subscriber line (DSL)) or in a wireless (such as infrared, wireless, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a read-only memory (ROM), a random access memory (RAM), a magnetic disk, or an optical disc.

What is claimed is:

1. A communication method, comprising:
    sending a first synchronization/broadcast signal block of at least one of a serving cell or a camping cell;
    sending at least one piece of cell measurement configuration information to a terminal device, wherein the at least one piece of cell measurement configuration information comprises N pieces of information indicating actual sending of at least one synchronization/broadcast signal block, wherein the N pieces of information indicating actual sending of the at least one synchronization/broadcast signal block indicate information about actually sent synchronization/broadcast signal blocks of M cells, wherein $1 \leq N \leq M$, wherein M is a quantity of measurement cells of the terminal device, and wherein both N and M are positive integers; and
    sending one or more second synchronization/broadcast signal blocks of the M measurement cells.

2. The communication method according to claim 1, wherein the sending the at least one piece of the cell measurement configuration information comprises:
    sending the at least one piece of cell measurement configuration information by using one or more signaling that comprises remaining minimum system information (RMSI), other system information (OSI), radio resource control (RRC) signaling, or downlink control information (DCI).

3. The communication method according to claim 1, wherein, when $N=M$, the N pieces of information indicating actual sending of the at least one synchronization/broadcast signal block comprise information about an actually sent synchronization/broadcast signal block of each of the M measurement cells.

4. The communication method according to claim 1, wherein the information indicating actual sending of the at least one synchronization/broadcast signal block comprises one or more of a full bitmap, a compressed bitmap, or a lookup table.

5. The communication method according to claim 1, wherein the at least one piece of cell measurement configuration information further comprises one or more common measurement information used for an intra-frequency/inter-frequency/inter-radio access technology (inter-RAT) system, a cell identity, frequency band information, or a measurement window configuration of a synchronization/broadcast signal block based measurement timing configuration (SMTC).

6. A communication method, comprising:
    receiving a first synchronization/broadcast signal block that is of at least one of a serving cell or a camping cell and that is sent by a network device;
    receiving at least one piece of cell measurement configuration information sent by the network device, wherein the at least one piece of cell measurement configuration information comprises N pieces of information indicating actual sending of at least one synchronization/broadcast signal block, wherein the N pieces of information indicating actual sending of the at least one synchronization/broadcast signal block indicate information about actually sent synchronization/broadcast signal blocks of M cells, wherein $1 \leq N \leq M$, wherein M is a quantity of measurement cells of a terminal device, and wherein both N and M are positive integers; and receiving one or more second synchronization/broadcast signal blocks of the M measurement cells according to the at least one piece of cell measurement configuration information.

7. The communication method according to claim 6, wherein the receiving the at least one piece of cell measurement configuration information comprises:

receiving the at least one piece of cell measurement configuration information using one or more of remaining minimum system information (RMSI), other system information (OSI), radio resource control (RRC) signaling, or downlink control information (DCI).

8. The communication method according to claim 6, wherein, when N=M, the N pieces of information indicating actual sending of the at least one synchronization/broadcast signal block comprise information about an actually sent synchronization/broadcast signal block of each of the M measurement cells.

9. The communication method according to claim 6, wherein the information indicating actual sending of the at least one synchronization/broadcast signal block comprises one or more of a full bitmap, a compressed bitmap, or a lookup table.

10. The communication method according to claim 6, wherein the at least one piece of cell measurement configuration information further comprises one or more of common measurement information used for an intra-frequency/inter-frequency/inter-radio access technology (inter-RAT) system, a cell identity, frequency band information, and a measurement window configuration of an SMTC.

11. A communications apparatus, comprising:
a sending unit;
a processor; and
a non-transitory compute readable medium storing a program for execution by the processor, the program including instructions to:
cause the sending unit to send a first synchronization/broadcast signal block of at least one of a serving cell or a camping cell;
cause the sending unit to send at least one piece of cell measurement configuration information to a terminal device, wherein the at least one piece of cell measurement configuration information comprises N pieces of information indicating actual sending of at least one synchronization/broadcast signal block, wherein the N pieces of information indicating actual sending of the at least one synchronization/broadcast signal block indicate information about actually sent synchronization/broadcast signal blocks of M measurement cells, wherein 1≤N≤M, M is a quantity of measurement cells of the terminal device, and wherein both N and M are positive integers; and
cause the sending unit to send one or more second synchronization/broadcast signal blocks of the M measurement cells.

12. The communications apparatus according to claim 11, wherein the instructions to cause the sending unit to send the at least one piece of cell measurement configuration information include instructions to:
send the at least one piece of cell measurement configuration information using one or more signaling that comprises remaining minimum system information (RMSI), other system information (OSI), radio resource control (RRC) signaling, or downlink control information (DCI).

13. The communications apparatus according to claim 11, wherein, when N=M, the N pieces of information indicating actual sending of the at least one synchronization/broadcast signal block comprise information about an actually sent synchronization/broadcast signal block of each of the M measurement cells.

14. The communications apparatus according to claim 11, wherein the information indicating actual sending of the at least one synchronization/broadcast signal block comprises at least one of a full bitmap, a compressed bitmap, or a lookup table.

15. The communications apparatus according to claim 14, wherein the at least one piece of cell measurement configuration information further comprises at least one of common measurement information used for an intra-frequency/inter-frequency/inter-radio access technology (inter-RAT) system, a cell identity, frequency band information, and a measurement window configuration of an SMTC.

16. A communications apparatus, comprising:
a receiving unit
a processor; and
a non-transitory compute readable medium storing a program for execution by the processor, the program including instructions to:
receive, through the receiving unit, a first synchronization/broadcast signal block that is of at least one of a serving cell or a camping cell and that is sent by a network device;
receive, through the receiving unit, at least one piece of cell measurement configuration information sent by the network device, wherein the at least one piece of cell measurement configuration information comprises N pieces of information indicating actual sending of at least one synchronization/broadcast signal block, wherein the N pieces of information indicating actual sending of the at least one synchronization/broadcast signal block indicate information about actually sent synchronization/broadcast signal blocks of M measurement cells, wherein 1≤N≤M, M is a quantity of measurement cells of a terminal device, and wherein both N and M are positive integers; and
receive, through the receiving unit, at least one second synchronization/broadcast signal blocks of the M measurement cells based on the at least one piece of cell measurement configuration information.

17. The communications apparatus according to claim 16, wherein the instructions to receive the at least one piece of cell measurement configuration information include instructions to:
receive the at least one piece of cell measurement configuration information using one or more of remaining minimum system information (RMSI), other system information (OSI), radio resource control (RRC) signaling, or downlink control information (DCI).

18. The communications apparatus according to claim 16, wherein, when N=M, the N pieces of information indicating actual sending of the at least one synchronization/broadcast signal block comprise information about an actually sent synchronization/broadcast signal block of each of the M measurement cells.

19. The communications apparatus according to claim 18, wherein the N pieces of information indicating actual sending of the at least one synchronization/broadcast signal block comprise information about an actually sent synchronization/broadcast signal block of each of N cell groups, and wherein the M measurement cells comprise the N cell groups.

20. The communications apparatus according to claim 16, wherein the information indicating actual sending of the at least one synchronization/broadcast signal block comprises at least one of a full bitmap, a compressed bitmap, and a lookup table.

21. The communications apparatus according to claim 16, wherein the at least one piece of cell measurement configuration information further comprises at least one of common measurement information used for an intra-frequency/inter-frequency/inter-radio access technology (inter-RAT) system, a cell identity, frequency band information, and a measurement window configuration of a synchronization/broadcast signal block based measurement timing configuration (SMTC).

* * * * *